(12) United States Patent
Au et al.

(10) Patent No.: US 12,722,804 B2
(45) Date of Patent: Sep. 1, 2026

(54) TIRE ALIGNMENT BREAKER BAR, YOKE AND ARTICULATING UTILITY

(71) Applicant: Government of the United States as represented by the Secretary of the Air Force, Wright-Patterson AFB, OH (US)

(72) Inventors: Tabitha Au, Luke AFB, AZ (US); Michael Williamson, Peoria, AZ (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 0 days.

(21) Appl. No.: 19/024,673

(22) Filed: Jan. 16, 2025

(65) Prior Publication Data

US 2026/0200599 A1 Jul. 16, 2026

(51) Int. Cl.
*B64F 5/10* (2017.01)

(52) U.S. Cl.
CPC .................................... *B64F 5/10* (2017.01)

(58) Field of Classification Search
CPC .... B64F 5/10; B64F 5/00; B23P 11/00; B23P 15/14; B23P 15/00; B23P 19/04; B23P 19/00
USPC ....................................................... 29/407.09
See application file for complete search history.

(56) References Cited

U.S. PATENT DOCUMENTS 2,584,832 A * 2/1952 Beringer ................. B64C 25/02 72/340
2,930,547 A * 3/1960 Hogan .................... B64C 25/50 244/50
4,345,727 A * 8/1982 Brown .................... B64C 25/12 244/102 R
4,524,929 A * 6/1985 Gebhard ................. B64C 25/60 244/104 FP
9,108,730 B2 * 8/2015 Grossman .............. B64D 37/04
10,112,699 B2 * 10/2018 Simonneaux ............. B64F 5/10
2016/0318630 A1 * 11/2016 Crow, Jr. ............. G01B 11/275
2016/0375989 A1 * 12/2016 Simonneaux ........... B64C 25/12 29/897.2
2022/0340305 A1 * 10/2022 Brooks ..................... B64F 5/50
2023/0382562 A1 * 11/2023 Chasteau .................. B64F 5/10

* cited by examiner

*Primary Examiner* — Lawrence Averick
(74) *Attorney, Agent, or Firm* — AFMCLO/JAZ; Larry L. Huston

(57) ABSTRACT

A tool for aligning a nose tire on a F-35 aircraft. The tool defining a longitudinal axis and a transverse axis perpendicular thereto. The tool has a yoke having two opposed arms extending outwardly from a common proximal end to two transversely spaced distal ends defining a space between the arms. Each arm has a protuberance at the distal end of the respective arm and articulable between open and closed positions. A trunnion adapted to fit into a gudgeon of a F-35 landing gear is disposed on each articulable protuberance. The trunnion extends towards the longitudinal axis and engages the gudgeon when the protuberance is in the closed position and easily disengages from the gudgeon when the protuberance is in the open position.

9 Claims, 9 Drawing Sheets

TIRE ALIGNMENT BREAKER BAR, YOKE AND ARTICULATING UTILITY

STATEMENT OF GOVERNMENT INTEREST

The invention described and claimed herein may be manufactured, licensed and used by and for the Government of the United States of America for all government purposes without the payment of any royalty.

CROSS REFERENCE TO RELATED APPLICATIONS

This application is a continuation of and claims the benefit of and priority to pending U.S. application Ser. No. 18/731,797 filed Jun. 3, 2024, now publication number US 2025/0368353 A1, the disclosure of which is incorporated herein by reference.

FIELD OF THE INVENTION

The present invention is related to a dual trunnionated tire alignment tool for the nose landing gear of an F-35 aircraft and particularly to such a dual trunnionated tool having articulable trunnions for ease engagement and disengagement with the nose landing gear.

BACKGROUND OF THE INVENTION

The Lockheed Martin F-35 is a single seat stealth-capable aircraft capable of carrying an ordinance payload greater than 8100 kg at supersonic speeds. The F-35 is said to be the most advanced aircraft in the world and expected to replace a host of other fighter aircraft, both domestically and internationally. Production of the F-35 airframe began Nov. 10, 2003 with the first flight completed Dec. 15, 2006. The F-35 airframe is executed in three platforms: the F-35A Lightening II designed for conventional runways and the most common platform; the F-35B Lightening II with vertical landing and short-field takeoff capability and the F-35C Lightening II built for aircraft carrier operations. All three platforms have one nose and two aft landing gear/wheel combinations.

Nine countries were involved with the development of the F-35 airframe. More than 1500 companies and 250000 jobs are involved in the supply chain and production of the F-35 airframe. Despite all of these advanced capabilities across three platforms, numerous development partners, years of production and thousands of hours of flight time, problems remain.

For example, F-35 tires are reported to last for 10 or fewer landings. It takes a four-man crew to lift an F-35 tire for service with tire weighing more than 160 pounds fully assembled. The nose landing gear must be aligned with at least with every tire change and in between after harsh landings.

These frequent nose landing gear alignments are critical for the aircraft. Particularly, the nose landing gear must be azimuthally aligned parallel to the longitudinal axis of the aircraft. Even slight misalignment can lead to mishandling, aircraft damage and even jeopardize pilot safety.

The nose landing gear alignment is determined by a rotatable collar. The collar has a notch which faces forward coincident the longitudinal axis. Currently the collar is aligned with a two leg tow bar. The two legs extend from respective proximal ends at a common hinge point to distal ends 11D remote therefrom. The distal ends 11D are disposed proximate the collar on the landing gear and the entire tow bar used to adjust the azimuthal angle. But despite years of use and refinement, problems remain. The tow bar is almost 12 feet long and weighs 100 pounds. The tow bar is difficult to use because of the size and weight, making accurate alignment of the nose landing gear more difficult to accomplish.

Furthermore, alignment requires at least a two person crew, typically referred to as maintainers. One person of the crew is at the landing gear and visually determines the desired azimuthal angle. That person relays instructions to the remote person who manipulates the heavy tow bar back and forth as qualitatively instructed by the first crew member. But this method can lead to problems as the visual determination may be subject to parallax error and other errors.

Furthermore, due to the size and weight of the tow bar it must be hauled on a tug to various locations on the tarmac. The tug and a qualified operator may not be available, delaying necessary maintenance for aircraft at distant locations.

Accordingly, a new approach is needed which overcomes the size, weight and accuracy problems which have been present across two decades, three platforms, nine countries, 1500 companies and 250000 employees. The present invention addresses the longstanding problems and provides improved accuracy of the critical nose landing gear alignment.

SUMMARY OF THE INVENTION

In one embodiment the invention comprises a tool for aligning a nose tire on a F-35 aircraft. The tool defining a longitudinal axis and a transverse axis perpendicular thereto and comprises: a yoke having two opposed arms extending outwardly from a common proximal end to two transversely spaced distal ends remote therefrom and defining a space therebetween, each arm having an articulable protuberance proximate the distal end of the respective arm; and a trunnion disposed on each articulable protuberance, each trunnion extending towards the longitudinal axis and being adapted to fit into a gudgeon of a F-35 landing gear.

In one embodiment the invention comprises a tool for aligning a nose tire on a F-35 aircraft. The tool defining a longitudinal axis and a transverse axis perpendicular thereto and comprises: a yoke having two opposed arms extending outwardly from a common proximal end to two transversely spaced distal ends remote therefrom and defining a space therebetween, at least one arm having an articulable protuberance proximate the distal end of the respective arm; and a trunnion disposed on each at least one articulable protuberance, each trunnion extending towards the longitudinal axis and being adapted to fit into a gudgeon of a F-35 landing gear.

In one embodiment the invention comprises a method of aligning a nose tire on an F-35 aircraft having an azimuth. The method comprises, in turn, the steps of: providing a tool defining a longitudinal axis and a transverse axis perpendicular thereto, the tool having an elongate breaker bar, a yoke having two opposed arms extending outwardly from a common proximal end to two distal ends remote therefrom and defining a space therebetween, the yoke being joined to the breaker bar proximate the common proximal end, an articulable protuberance juxtaposed with each distal end and having a trunnion thereon, each trunnion extending towards the longitudinal axis and being adapted to fit into a gudgeon of a F-35 landing gear; and articulating at least one protuberance to an open position; disposing each trunnion into a respective gudgeon of the F-35 landing gear; articulating the at least one protuberance to a closed position wherein the respective trunnion is engaged with the corresponding gudgeon; and manipulating the breaker to minimize the azimuth of the F-35 landing gear.

DETAILED DESCRIPTION OF THE INVENTION

Figures 1A, 1B:
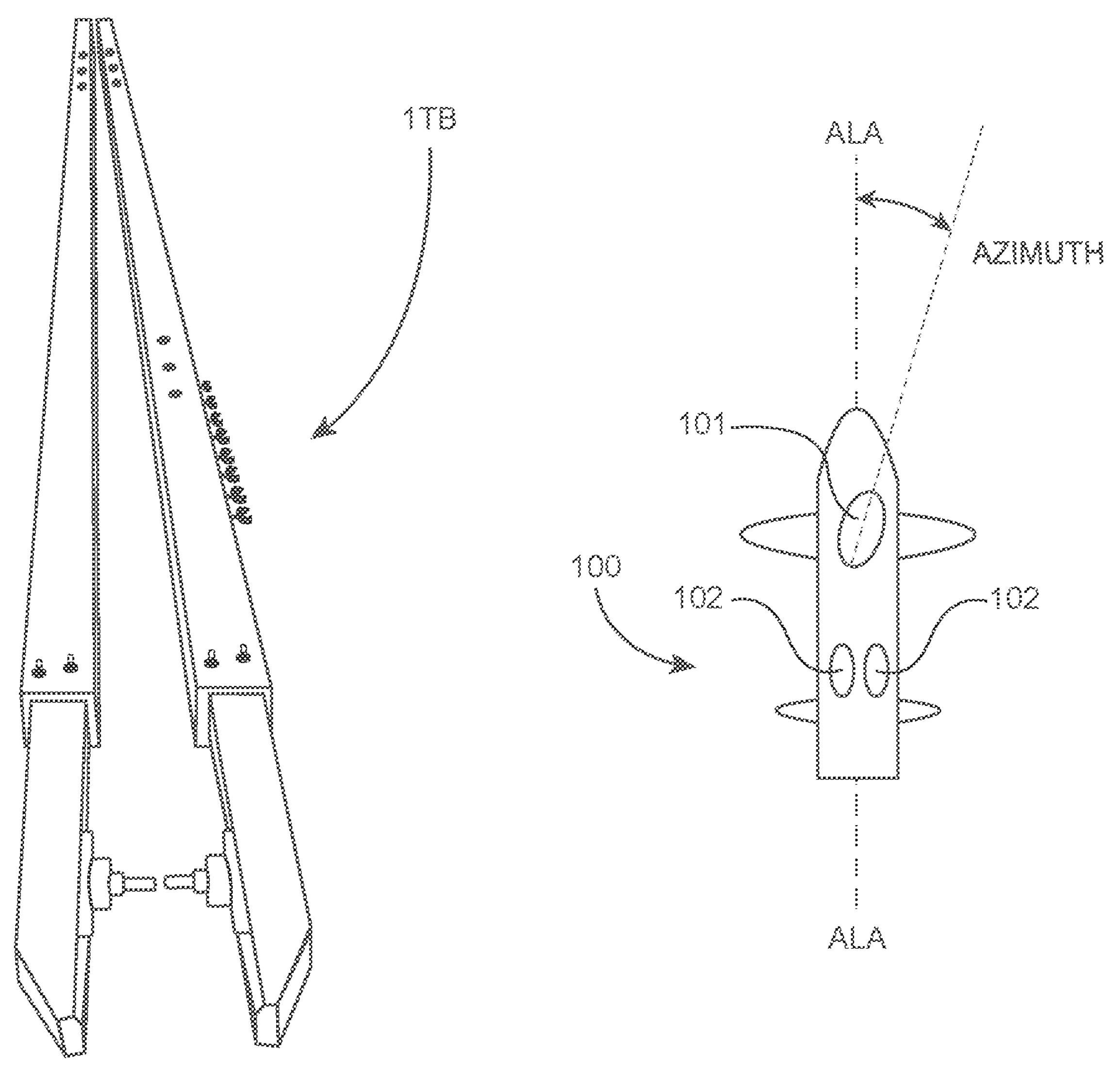
FIG. 1A is a schematic top plan view of an aircraft showing the azimuth of the nose landing gear.
FIG. 1B is a scale perspective view of a tow bar according to the prior art.

Referring to FIG. 1A, aircraft 100 have an aircraft longitudinal axis ALA. Many aircraft 100 according to the current art, such as an F-35, have a single forward nose landing gear 101 and dual aft landing gears 102. Each landing gear 101, 102 supports an associated tire. The landing gears 101, 102 must support the tire in an alignment parallel to the aircraft longitudinal axis ALA. Furthermore, the tire of the nose landing gear 101 must be coincident the aircraft longitudinal axis ALA. While the discussion below is directed to an F-35 aircraft 100, one of skill will recognize the present invention may be resized and used with any similarly appointed aircraft 100.

A discrepancy between the aircraft longitudinal axis ALA and the angle of the nose landing gear 101 tire is referred to herein as an azimuth. The azimuth is taken in the horizontal plane. The azimuth may be qualitatively determined or quantitatively determined, as designated by the has marks. Each hash mark may indicate one degree or other angular measurement as desired. When the azimuth is zero, the angle of the nose tire is properly parallel to and coincident the aircraft longitudinal axis ALA.

Referring to FIG. 1B, according to the prior art a tow bar 1TB is used to maneuver the aircraft 100 from one location to another on the tarmac. The tow bar 1TB is also used to align the nose landing gear 101 in order to zero the azimuth.

This tow bar 1TB is approximately 12 feet in length and weighs approximately 100 pounds. Relocating the tow bar 1TB according to the prior art between aircraft 100 is laborious. The tow bar 1TB must be loaded onto a tug, a qualified tug operator located and the tow bar 1TB delivered to the particular aircraft 100 where needed. After maintenance on that aircraft 100, the process must be repeated for the next aircraft 100.

Furthermore, using the tow bar 1TB to align the nose landing gear 101 is also laborious. The nose landing gear 101 must be accurately aligned, to a very precise azimuthal angle. But the tow bar 1TB is heavy, making accurate alignments difficult to achieve and tiresome for the people doing the alignment.

Figure 2:
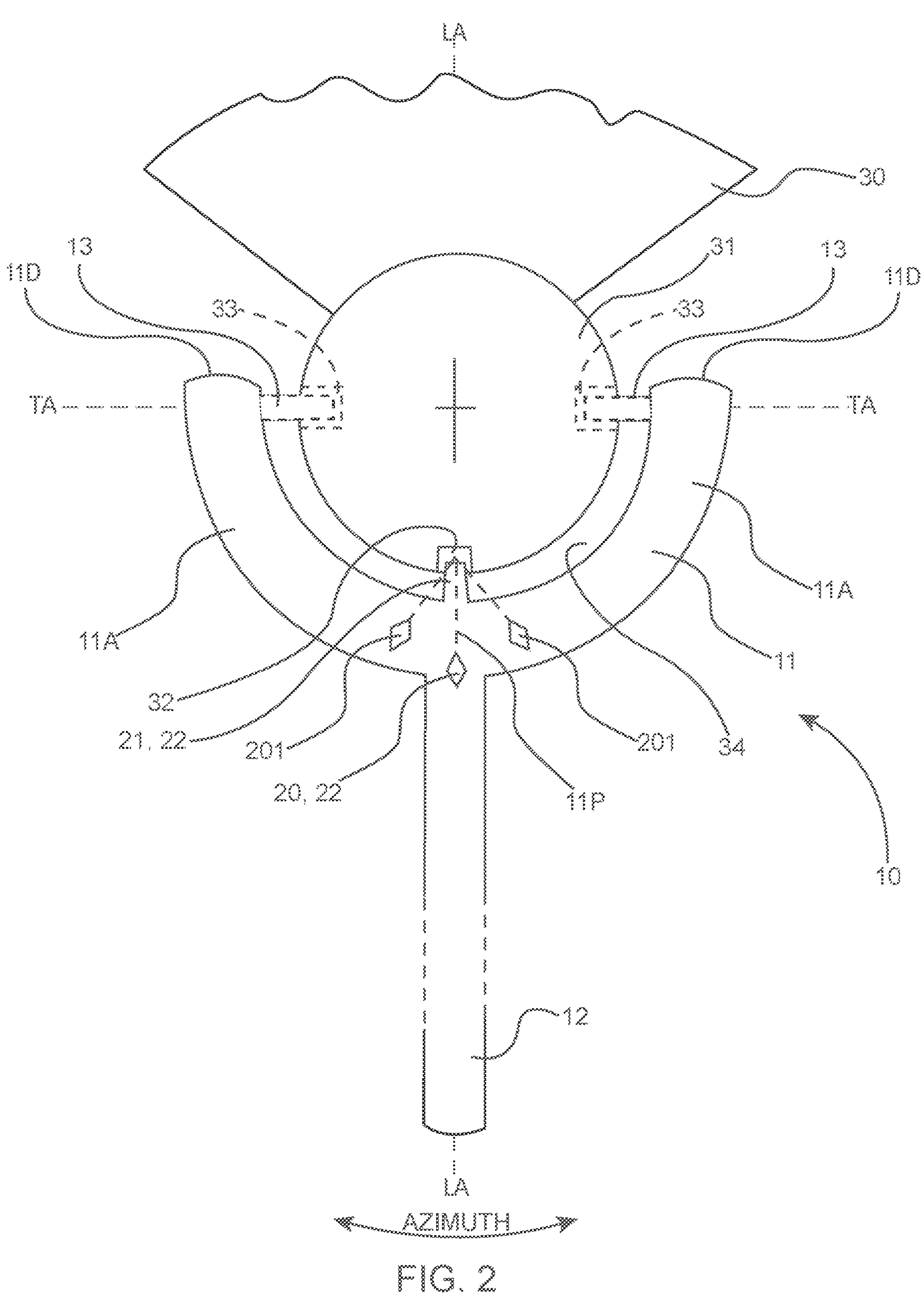
FIG. 2 is a schematic, fragmentary top plan view of a tire alignment breaker bar and yoke according to the present invention in use with a collar of a landing gear.

Referring to FIG. 2, the F-35 aircraft 100 has a collar 31 at the forward position of the nose landing gear 101 and which is held in static position by a portion of the landing gear frame 30. The collar 31 has a notch 32 at the forward position of the collar 31. The notch 32 designates the aircraft longitudinal axis ALA and is coincident the centerline of the aircraft 100. The notch 32 is the benchmark for determining azimuthal alignment of the landing gear 101 relative to the aircraft longitudinal axis ALA.

The landing gear frame 30 also has two opposed gudgeons 33. The gudgeons 33 are perpendicular to the aircraft longitudinal axis ALA and disposed in a different horizontal plane than the notch 32.

A tool 10 according to the present invention has a longitudinal axis LA and is preferably symmetric about the longitudinal axis LA which is the longitudinal centerline of the yoke 11. The tool 10 has three major components, a yoke 11 for attaching to the landing gear 101, a breaker bar 12 joined thereto and functioning as a handle and an index 22 for determining the azimuth.

Examining the invention in more detail, the yoke 11 has two opposed arms 11A. The two opposed arms 11A extend outwardly from a common proximal end 11P disposed on the longitudinal axis LA to mutually opposed distal ends 11D spaced outwardly of the longitudinal axis LA. An articulable protuberance 11E is juxtaposed with and includes each distal end 11D of the yoke 11.

The yoke 11 may be generally planar and may be disposed in a generally horizontal position during use. In use there may be a space 34, particularly a semi-annular space 34 between the arms 11A of the yoke 11 and the landing gear 101.

Each arm 11A of the yoke 10, and particularly each protuberance 11E thereof, has a trunnion 13 juxtaposed with a respective distal end 11D of that arm 11A. The trunnions 13 extend inwardly towards the longitudinal axis LA. The opposed trunnions 13 are sized and spaced to fit into the gudgeons 33 of the landing gear 101. The trunnions 13 may be generally cylindrically shaped with a round cross section and optionally chamfered. A transverse axis TA connects the centers of the round trunnions 13. The transverse axis TA and longitudinal axis LA are mutually perpendicular and define the plane of the tool 10. The trunnions 13 apply torque to the landing gear 101 and tire to adjust, minimize and eliminate the azimuth.

The breaker bar 12 may be removably or fixedly joined to the yoke 11 and particularly at the common proximal end 11P of the yoke 11 arms 11A. The breaker bar 12 is coincident the longitudinal axis LA and functions as a handle for manipulation of the tool 10 by a user. The protuberances 11E may articulate within the plane defined by the longitudinal axis LA and transverse axis TA. The breaker bar 12 may be segmented and connected by threads 15. The breaker bar 12 and trunnions 13 may removably insert into complementary holes 14 to allow for disassembly and storage.

The yoke 11 may have an optional index 22. The index 22 is preferably parallel to and disposed on the longitudinal axis LA. The index 22 is sued to align the notch 32 with the longitudinal axis LA, thereby reducing the azimuth to zero. The index 22 may be fixedly joined to the yoke 11 or breaker bar 12. This arrangement provides the benefit of minimizing calibration. Or the index 22 may be adjustably joined to the yoke 11 or breaker bar 12. This arrangement provides the benefit of minimizing ensuring accuracy when the index 22 is subject to rough handling or misuse.

In one embodiment the index 22 may comprise a pointer 21 which extends towards and optionally into the notch 32. The pointer 21 is coincident and parallel to the longitudinal axis LA. The pointer 21 may lie in the same plane as the longitudinal axis LA and the transverse axis TA. The pointer 21 may be removably attached to the yoke 11 or may be integral therewith. In one particular embodiment the pointer 21 extends outwardly from the proximal end 11P of the arms 11A of the yoke 11. This embodiment provides the benefit that there are no moving parts or replaceable parts.

In another embodiment the index 22 may further comprise a laser 20. The laser 20 is coincident and parallel to the longitudinal axis LA. The laser 20 may lie in the same plane as the longitudinal axis LA and the transverse axis TA. In one particular embodiment the laser 20 beam shines outwardly from the proximal end 11P of the arms 11A of the yoke 11, providing extended distance to the notch 32.

The laser 20 may be a single visible beam and may optionally provide a quantitative measurement of the distance from the respective position on the yoke 11 to the back of the notch 32. A DWHT77100 laser distance measurer available from DeWalt Too Co. of Towson, MD, a REVB-DILL 100 cordless line laser level available from Stanley Black & Decker, Inc. of New Britain, CT or a 417D laser distance meter available from Fluke Corp. of Everett, WA may be suitable. Alternatively the laser 20 may display one plane or more planes which intersect at the center of the notch 32. A621CG Self-leveling green laser level cross line available from Huepar of Zhuhai City, China may be suitable. This embodiment provides the benefit that there are no moving parts or replaceable parts.

In an alternative embodiment, instead of or in addition to a single laser 20 coincident the longitudinal axis LA the yoke 11 may have one or more lasers 201 offset from the longitudinal axis LA. For example two offset and symmetrically opposed lasers 201 may be used, with one offset laser 201 disposed 45 degrees out on each side of the longitudinal axis LA. This arrangement prophetically provides the benefit of more accurate alignment with the notch 32. Additionally a pointer 21 may be used in conjunction with the lasers 20, 201.

Figure 3:
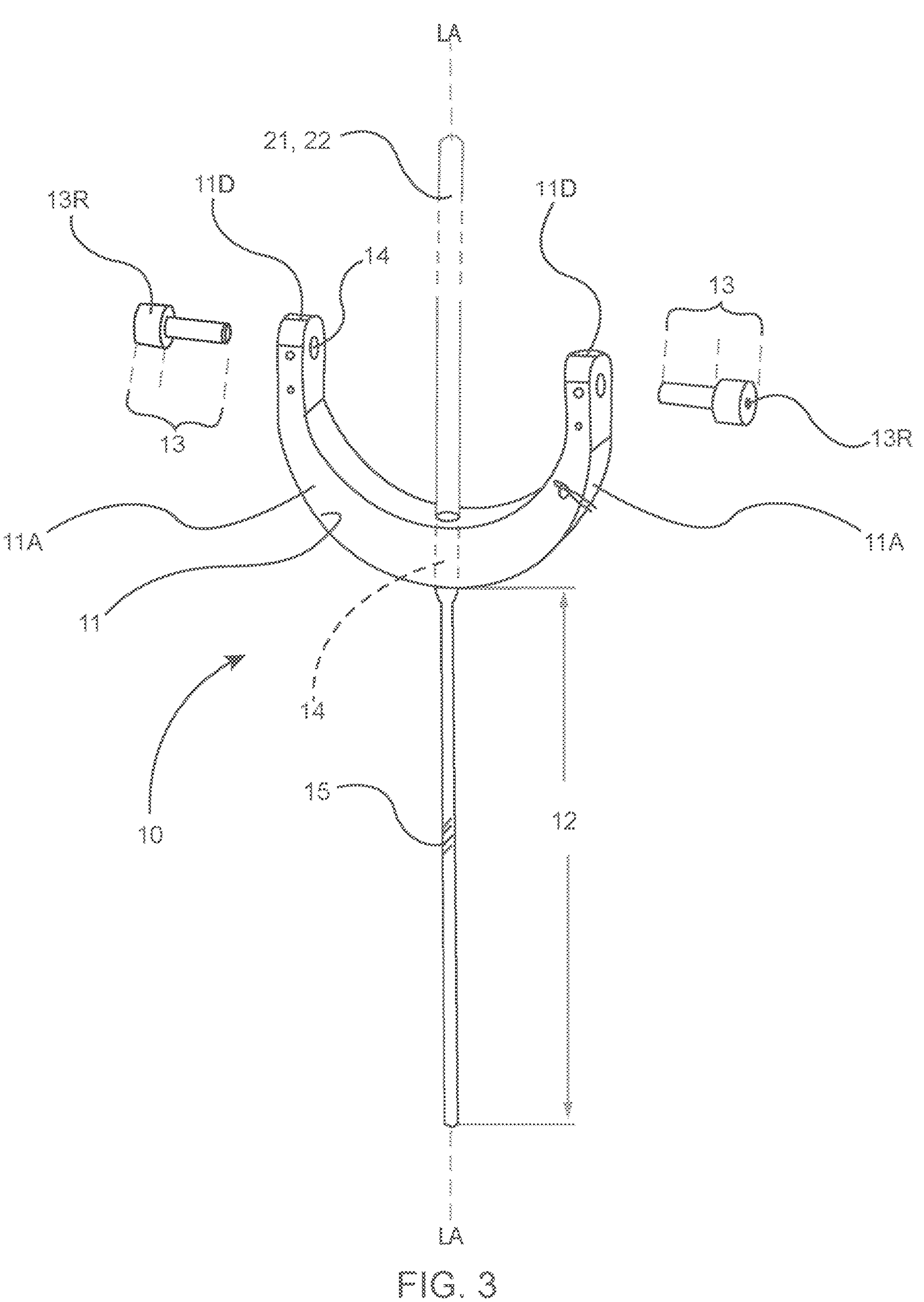
FIG. 3 is a scale exploded perspective view of a tire alignment breaker bar and yoke according to the present invention.

Referring to FIG. 3, when the protuberances 11E are in a closed position as shown, removable trunnions 13 may be inserted from outside the yoke 11 towards the longitudinal axis LA. The trunnions 13 may have a shank which intercepts the gudgeon 33 of the landing gear 101. The trunnions 13 may have a shoulder 13R which is enlarged relative to the shank to limit insertion and assist in rigidly holding the trunnion 13 in place. The protuberance 11E may be locked into the closed position with a retaining pin.

Referring to FIGS. 4A-4D, and examining the invention in more detail, the left protuberance 11E is shown in a closed position and the right protuberance 11E is shown in an open position. The open position provides the utility that a maintainer can easily engage the tool 10 onto the collar 30 for subsequent use. One protuberance 11E or both protuberances 11E may be in the open position when the tool is deployed onto the collar 30. After engaging the trunnion 13 with the gudgeon 33 of the collar 30 in the open position, the protuberance 11E is toggled to a closed position. Each trunnion 13 is then inserted into and engaged with the respective gudgeon 33.

With both protuberances 11E in the closed position and both trunnions 13 inserted into the respective gudgeons 33, the tool 10 is then used to align the forward landing gear 101. After alignment of the forward landing gear 101 one or both of the protuberances 11E are articulated to the open position for convenient and ergonomic removal of the tool from the collar 30. The protuberances 11E may articulate outwardly from the longitudinal axis LA as needed, including articulation of up to 90 degrees to be parallel to the transverse axis TA simply articulate to an angle of 65 degrees to provide adequate clearance for installation. The utility of such articulation provides the benefits of both convenient and ergonomic engagement of the tool 10 onto the collar 30, and subsequent convenient and ergonomic removal of the tool from the collar all without compromising the efficacy or accuracy of the tool 10 during the alignment procedure.

The protuberances 11E may articulate about a hinge 11H which is perpendicular to the plane of the yoke 10. The protuberances 11E may be bistable, i.e. secure in either the open position or closed position but not in between. The hinge 11H may be a living hinge 11H for convenience of manufacture or a bistable hinge 11E if a bistable configuration is desired. A living hinge 11H may be made according to: U.S. Pat. No. 6,135,530 to Blaszczak et al.; U.S. Pat. No. 7,685,676 to Mc Clellan; U.S. Pat. No. 7,945,995 to Gates the disclosures of which are incorporated herein by reference. A bistable torsional hinge 11H may be used and made according to U.S. Pat. No. 2,235,984 to Devereaux, the disclosure of which is incorporated herein by reference. A bistable hinge 11H provides the benefit that the protuberances 11E do not wobble back and forth during transport and positioning, thereby reducing injury to personnel.

The protuberances 11E may be biased towards the longitudinal axis LA and into the closed position by respective springs 140. Any suitable spring 140, such as a torsional spring 140 or extension coil spring 140 may be used. An extension spring 140 may extend between the inside of a protuberance 11E and the inside of the corresponding arm 11A. More particularly such spring 140 may extend between a socket 140T on the inside of the protuberance 11E and a stub 140B on the inside of the arm 11A.

The tool 10 may have a single spring 140 one arm 11A operably associated with the respective protuberance 11E and no spring on the other protuberance 11E. Alternatively, the tool 10 may have a pair of springs 140, with one spring 140 operably biasing each protuberance 11E towards and preferably to the closed position. If a pair of springs 140 is utilized, the springs 140 may be mutually identical for simplicity. Alternatively, If a pair of springs 140 is utilized, the springs 140 may be mutually different to accommodate different physical strengths of the maintainers. By mutually different springs 140 it is meant the springs 140 apply different retraction forces to hold the protuberances 11E in the closed position.

The arm 11A may have one or more stops 141 to limit the articulation of the corresponding protuberance 11E and define the closed position. The protuberance 11E may be notched with one or more pockets 142. Each stop 141 may seat in a respective pocket 142 to ensure proper alignment and fix the protuberance 11E in position during use on the collar 30. An embodiment with a stop 141 juxtaposed with the distal end 11D of the arm 11A and a pocket 142 disposed on the inside of the protuberance 11E is shown. However, these features may prophetically be transposed so that the stop 141 is disposed on the protuberance 11E and the pocket 142 on the arm 11A.

Figure 4A:
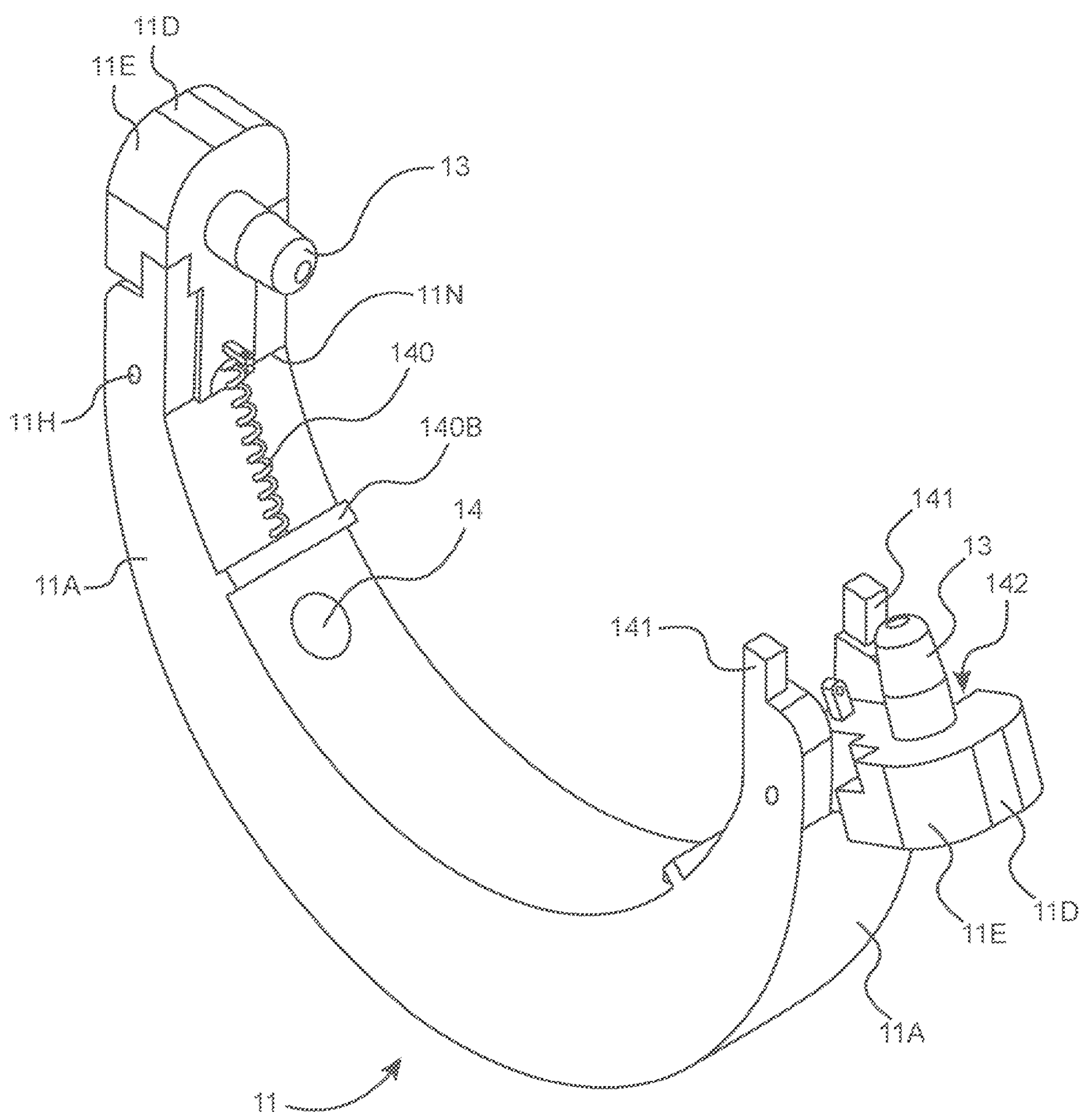
FIG. 4A is a scale perspective view of a yoke according to the present invention shown in phantom taken from a first perspective.
Figure 4B:
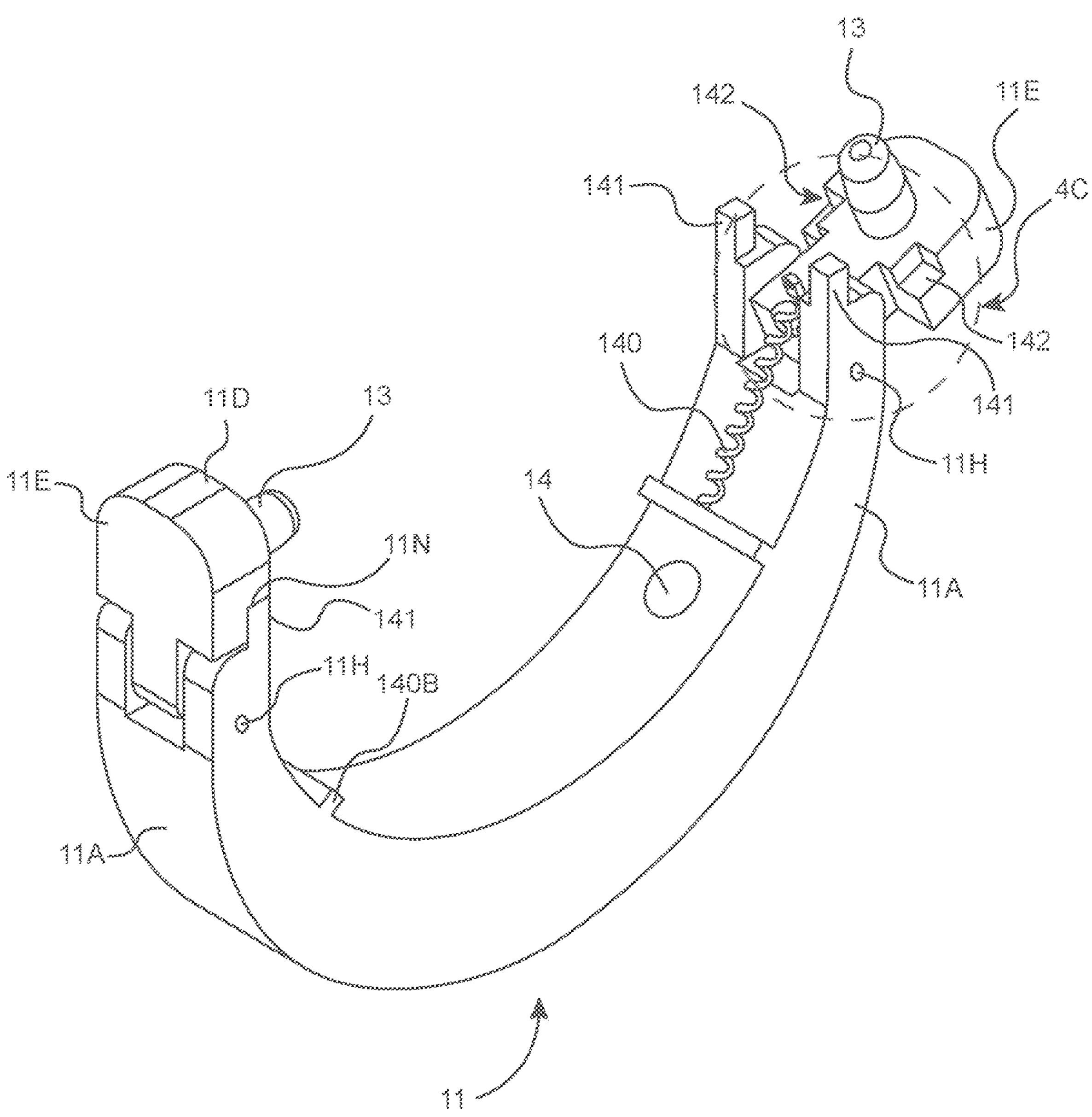
FIG. 4B is a scale perspective view of the yoke of FIG. 4A taken from a second perspective.
Figure 4C:
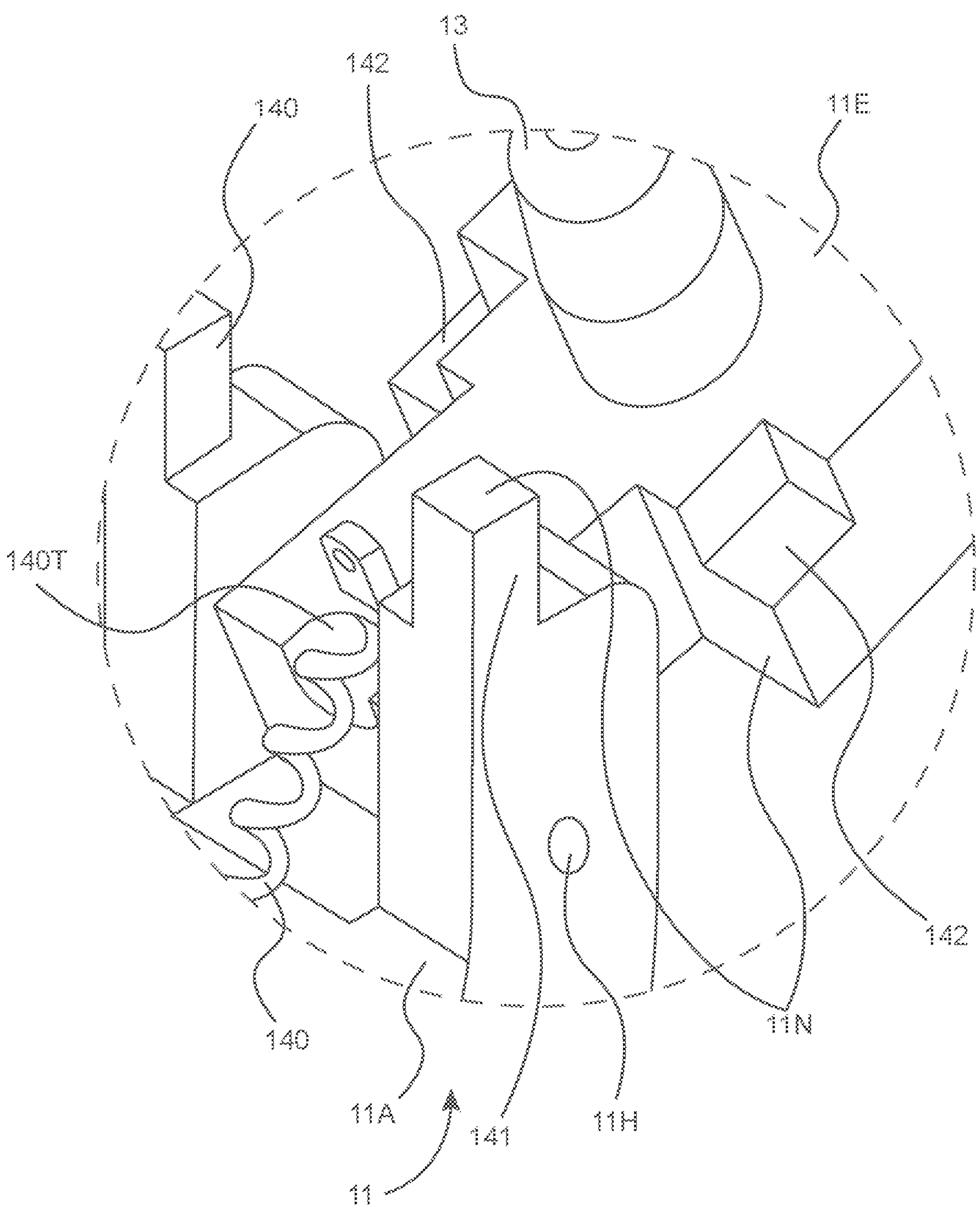
FIG. 4C is an enlarged scale fragmentary perspective view taken at circle 4C of FIG. 4B.
Figure 4D:
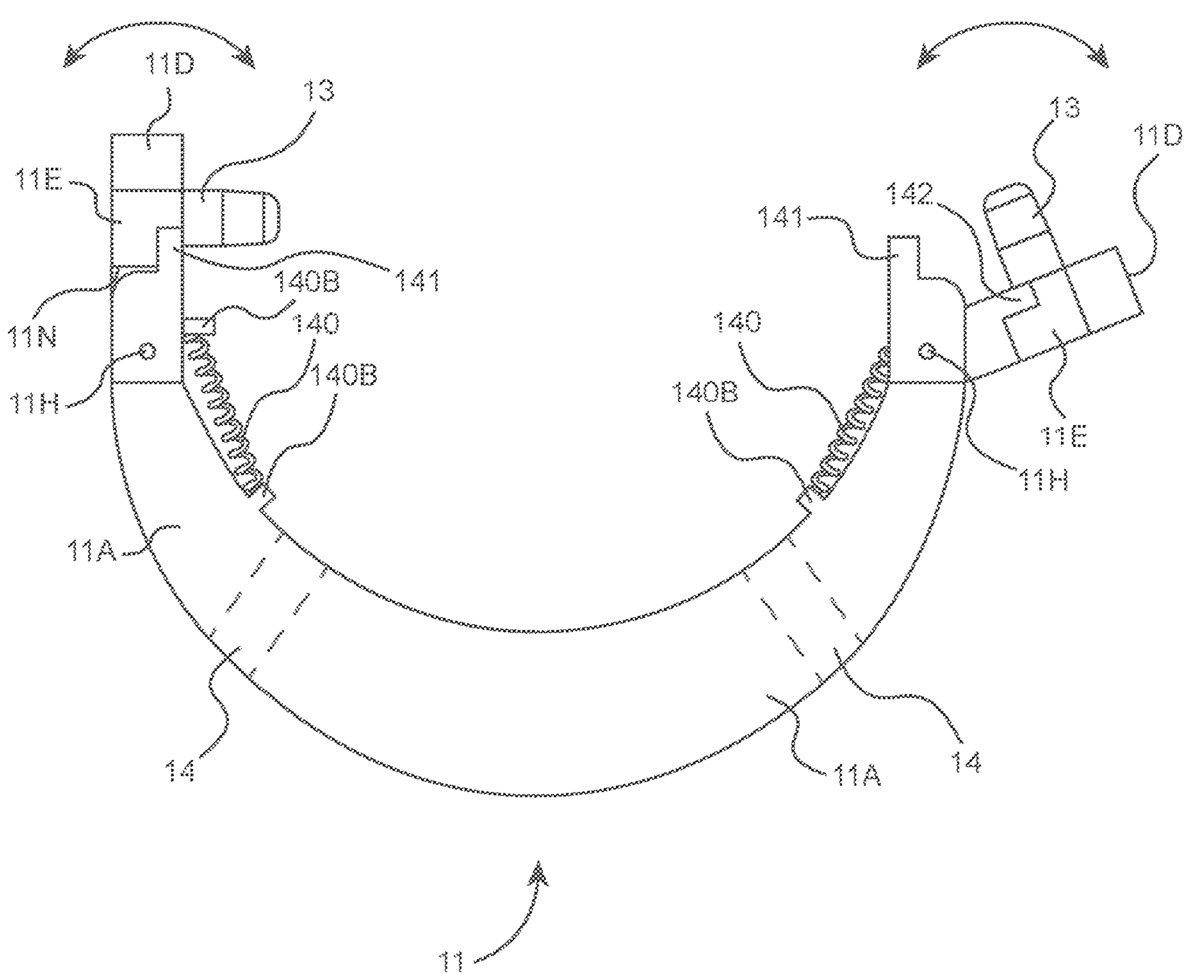
FIG. 4D is a scale top plan view of the yoke of FIG. 4A.

Referring to FIG. 4D in particular, a protuberance 11E may bilaterally articulate within the plane of the tool 10 as shown by the arrows. However the invention is not so limited. If the hinge 11H is not perpendicular to the plane of the tool 10, then articulation of that protuberance 11E is skewed relative thereto. Articulation of the protuberance 11E from an elevated position when the tool is horizontal may provide the benefit of ergonomics for the maintainers.

Referring back to FIG. 2, the demarcation 11N between the protuberance 11E and stationary arm 11A protuberance 11E need not be parallel to the transverse axis TA. If the demarcation 11N is angled towards the collar 30 as shown by the left arm 11A, the protuberance 11E will open further than occurs with the demarcation 11N parallel to the transverse axis TA. This arrangement provides increased flexibility for fitting the trunnions 13 into the gudgeons. If the demarcation 11N is angled away from the collar 30 as shown by the right arm 11A, the protuberance 11E will open less than occurs with the demarcation 11N parallel to the transverse axis TA. This arrangement provides increased safety for by reducing the pinch area.

Figure 5:
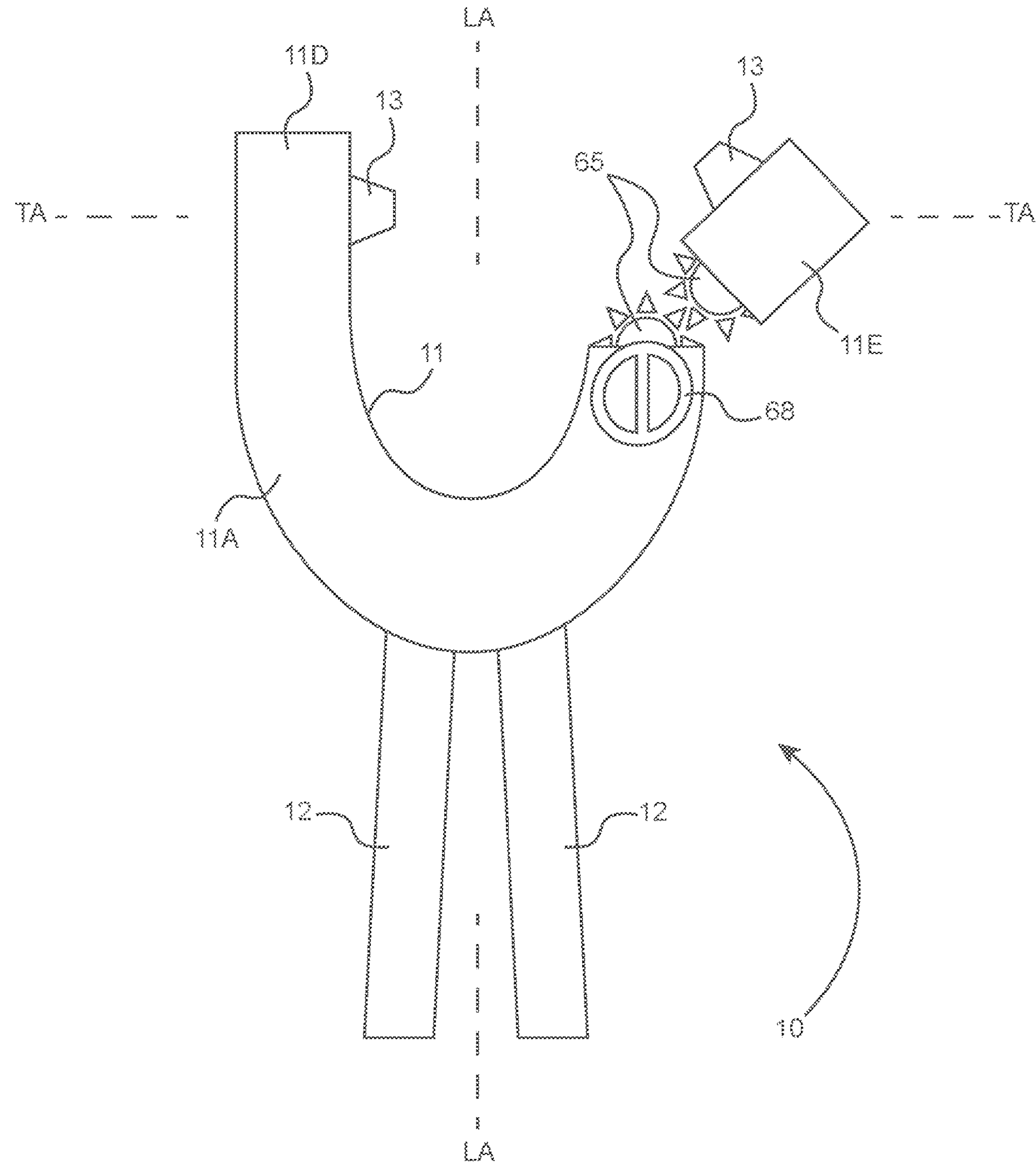
FIG. 5 is a schematic top plan view of an alternative embodiment of a tool having spur gears for articulation.

Referring to FIG. 5, the tool 10 may have one arm 11A with a fixed trunnion 13 and one arm 11A with a movable protuberance 11E. The left trunnion 13 is shown in a closed position and the right protuberance 11E and respective trunnion 13 are shown in an open position. For such a tool 10 only a single arm 11A may be provided with an articulable protuberance 11E. The other arm 11A not have an articulable protuberance 11E, but instead simply has the trunnion 13 mounted in fixed juxtaposition with the distal end 11D of the arm 11A as shown in commonly assigned application Ser. No. 18/731,797 filed Jun. 3, 2024 incorporated herein by reference. The embodiment having dual articulable protuberances 11E provides the benefit that application and removal of the tool to/from the front landing gear 101 from either side of the aircraft 100 or simultaneously both sides of the aircraft 100 may be accomplished. The embodiment having a single articulable protuberance 11E provides the benefits of fewer parts and less expensive manufacture.

If desired, one or both articulable protuberances 11E may be guided throughout the articulation between the open position and closed position by spur gears 65. A first spur gear 65 may be disposed at the distal end 11E of the arm 11A. A second and complementary spur gear 65 may be operably and engagedly disposed on the protuberance 11E to mesh with the first spur gear 65. This arrangement provides the benefit of transmitting more load between the arm 11A and a closed protuberance 11E. One or both of the trunnions 13 may be tapered for ease of insertion into the gudgeons 33.

The tool 10 may further comprise an electric motor 68, such as stepper motor 68. The electric motor 68 may be powered by mains or preferably is battery powered. The electric motor 68 may be external to the respective arm 11A or disposed within a hollow arm 11A. The electric motor 68 may drive the respective spur gear 65 disposed on the arm 11A, which in turn drives the inter-engaged spur gear 65 on the protuberance 11E. This arrangement provides the benefit that a stepper motor 68 may provide for pre-programmed and precise articulation of the protuberance 11E as needed for rapid installation and removal of the tool 10.

If desired, the tool 10 may have plural breaker bars 12. The breaker bars 12 may be offset from and skewed relative to the longitudinal axis LA. This arrangement provides the benefit that two maintainers can simultaneously adjust the landing gear 101 without interfering with each other.

Figure 6:
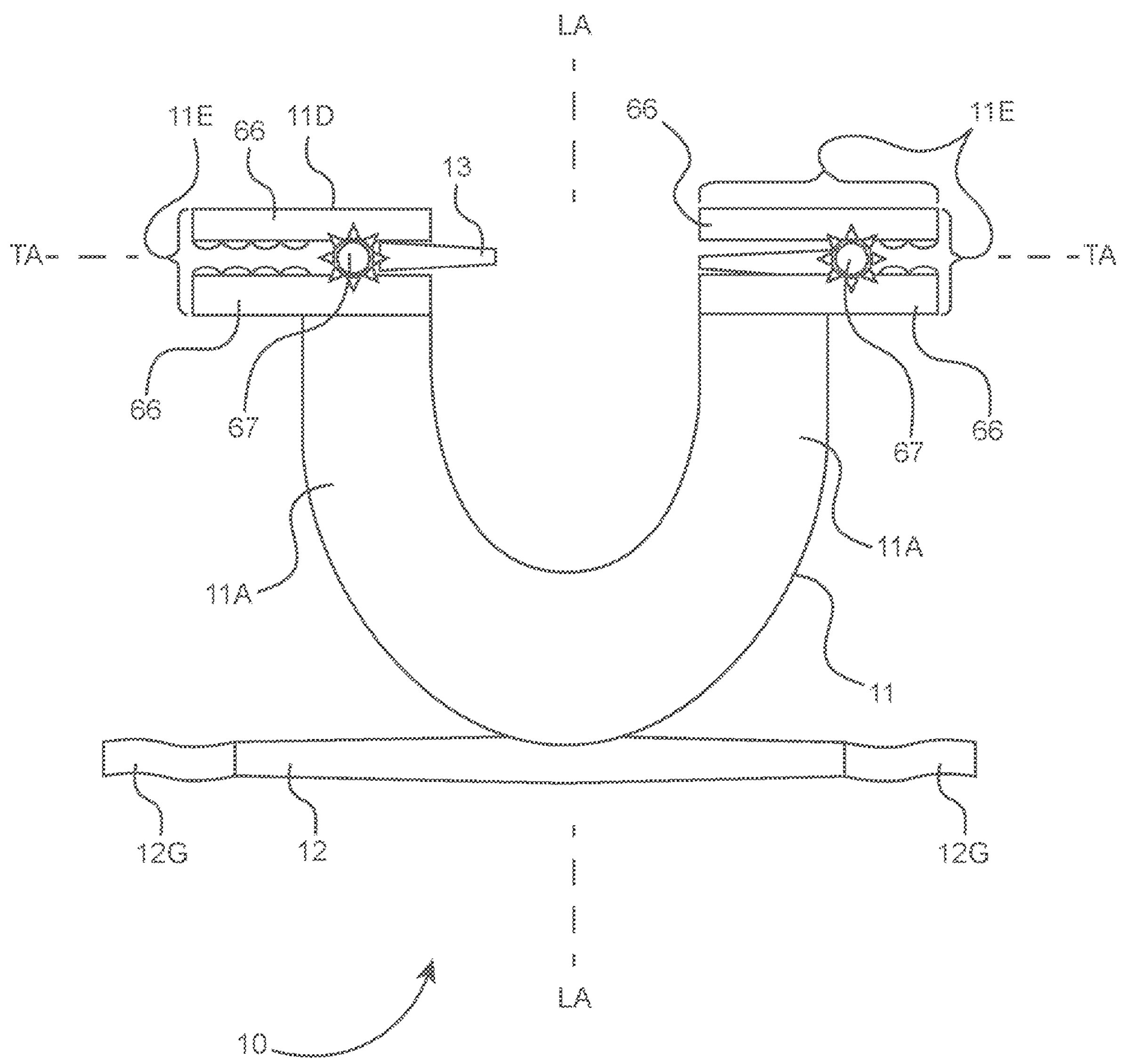
FIG. 6 is a schematic top plan view of a tool having rack and pinion mounted trunnions.

Referring to FIG. 6, again a tool 10 having the left protuberance 11E and trunnion 13 shown in a closed position and the right protuberance 11E and trunnion 13 shown in an open position is presented. This embodiment has a yoke 11 with at least one arm 11A having a fixed rack gear 66 juxtaposed with the distal end 11D thereof. The respective trunnion 13 is mounted on a pinion gear 67 for bilateral movement on the stationary rack gear 66 in the directions of the arrows. The pinion gear 67 and associated trunnion 13 move in and out towards and away from the longitudinal axis on the rack gear 66. In a preferred embodiment the rack gear 66 is parallel to the transverse axis TA. The pinion gear 67 may be rotatably driven by an electric motor 68 as described above.

If desired, the breaker bar 12 may be parallel to the transverse axis TA. This arrangement provides the benefit that two maintainers can simultaneously adjust the landing gear 101 without interfering with each other. The breaker bar 12 may taper to have increased section modulus as the longitudinal axis LA is approached to accommodate the increased cantilever load. The breaker bar 12 may have one or more grips 12G to improve comfort and ergonomics for the user.

All values disclosed herein are not strictly limited to the exact numerical values recited. Unless otherwise specified, each such dimension is intended to mean both the recited value and a functionally equivalent range surrounding that value. For example, a dimension disclosed as "40 mm" is intended to mean "about 40 mm." The term "or" as used herein is to be interpreted as an inclusive or meaning any one or any combination. Therefore, "A, B or C" means "any of the following: A; B; C; A and B; A and C; B and C; A, B and C." Every document cited herein, including any cross referenced or related patent or application, is hereby incorporated herein by reference in its entirety unless expressly excluded or otherwise limited. The citation of any document or commercially available component is not an admission that such document or component is prior art with respect to any invention disclosed or claimed herein or that alone, or in any combination with any other document or component, teaches, suggests or discloses any such invention. Further, to the extent that any meaning or definition of a term in this document conflicts with any meaning or definition of the same term in a document incorporated by reference, the meaning or definition assigned to that term in this document shall govern according to *Phillips* v. *AWH Corp.,* 415F.3d 1303 (Fed. Cir. 2005). All limits shown herein as defining a range may be used with any other limit defining a range of that same parameter. That is the upper limit of one range may be used with the lower limit of another range for the same parameter, and vice versa. As used herein, when two components are joined or connected the components may be interchangeably contiguously joined together or connected with an intervening element therebetween. A component joined to the distal end of another component may be juxtaposed with or joined at the distal end thereof. While particular embodiments of the present invention have been illustrated and described, it would be obvious to those skilled in the art that various other changes and modifications can be made without departing from the spirit and scope of the invention and that various embodiments described herein may be used in any combination or combinations. For example, while the tool 10 of the present invention is described in conjunction with an F-35 aircraft 100, the tool 10 may be used with any aircraft 100 having a similar collar 30 configuration. It is therefore intended the appended claims cover all such changes and modifications that are within the scope of this invention.

What is claimed is:

1. A tool for aligning a nose tire on a F-35 aircraft, the tool defining a longitudinal axis and a transverse axis perpendicular thereto and comprising:

a yoke having two opposed arms extending outwardly from a common proximal end to two transversely spaced distal ends remote therefrom and defining a space therebetween, each arm having an articulable protuberance proximate the distal end of the respective arm wherein each protuberance is bilaterally articulable from a closed position wherein the respective trunnion is parallel to the transverse axis to an open position wherein the respective trunnion is skewed relative to the transverse axis, protuberance being bistable in the open position and the closed position and not therebetween; and a trunnion disposed on each articulable protuberance, each trunnion extending towards the longitudinal axis and being adapted to fit into a gudgeon of a F-35 landing gear.

2. A tool according to claim 1 wherein each protuberance articulates about a hinge perpendicular to a plane defined by the mutually perpendicular longitudinal axis and transverse axis.

3. A tool according to claim 1 further comprising a spring operably associated with one protuberance and biasing that protuberance towards a closed position.

4. A tool for aligning a nose tire on a F-35 aircraft, the tool defining a longitudinal axis and a transverse axis perpendicular thereto and comprising:

a yoke having two opposed arms extending outwardly from a common proximal end to two transversely spaced distal ends remote therefrom and defining a space therebetween, each arm having an articulable protuberance proximate the distal end of the respective arm;

a trunnion disposed on each articulable protuberance, each trunnion extending towards the longitudinal axis and being adapted to fit into a gudgeon of a F-35 landing gear, and a pair of springs with a spring operably associated with each protuberance and biasing each protuberance towards a closed position wherein the protuberance is parallel to the transverse axis.

5. A tool according to claim 4 wherein the springs have mutually different retraction forces.

6. A tool according to claim 4 further comprising at least one stop juxtaposed with the distal end of an arm and limiting articulation of the corresponding protuberance to thereby define the closed position.

7. A tool according to claim 6 further comprising a respective pocket disposed on the protuberance and positionally associated with each at least one stop to receive the stop therein while in the closed position and provide proper alignment of the protuberance during use.

8. A tool for aligning a nose tire on a F-35 aircraft, the tool defining a longitudinal axis and a transverse axis perpendicular thereto and comprising:

a yoke having two opposed arms extending outwardly from a common proximal end to two transversely spaced distal ends remote therefrom and defining a space therebetween, each arm having an articulable protuberance proximate the distal end of the respective arm;

a trunnion disposed on each articulable protuberance, each trunnion extending towards the longitudinal axis and being adapted to fit into a gudgeon of a F-35 landing gear; and an elongate breaker bar cantilevered outwardly from the common proximal end of the yoke.

9. A tool according to claim 8 wherein the elongate breaker bar is coincident the longitudinal axis.

* * * * *